United States Patent
Weh et al.

(10) Patent No.: US 9,586,564 B2
(45) Date of Patent: Mar. 7, 2017

(54) PRESSURE GENERATOR FOR A HYDRAULIC VEHICLE BRAKE SYSTEM

(71) Applicant: Robert Bosch GmbH, Stuttgart (DE)

(72) Inventors: Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/751,722

(22) Filed: Jun. 26, 2015

(65) Prior Publication Data

US 2015/0375727 A1 Dec. 31, 2015

(30) Foreign Application Priority Data

Jun. 27, 2014 (DE) .................. 10 2014 212 413

(51) Int. Cl.

| | |
|---|---|
| *F16H 25/20* | (2006.01) |
| *B60T 8/40* | (2006.01) |
| *F16H 57/00* | (2012.01) |
| *B60T 13/74* | (2006.01) |
| *F16H 25/22* | (2006.01) |

(52) U.S. Cl.
CPC .......... *B60T 8/4022* (2013.01); *B60T 8/4018* (2013.01); *B60T 13/745* (2013.01); *F16H 25/20* (2013.01); *F16H 57/00* (2013.01); *F16H 25/2204* (2013.01); *F16H 2025/2087* (2013.01); *F16H 2057/0062* (2013.01)

(58) Field of Classification Search
None
See application file for complete search history.

(56) References Cited

U.S. PATENT DOCUMENTS

| | | | | |
|---|---|---|---|---|
| 6,938,735 B1 * | 9/2005 | Hilzinger | ................ | F16D 65/18 188/156 |
| 2003/0102192 A1 * | 6/2003 | Kapaan | .................... | F16D 65/18 188/72.7 |
| 2003/0178264 A1 * | 9/2003 | Halasy-Wimmer | ..... | F16D 65/18 188/158 |
| 2006/0081076 A1 * | 4/2006 | Otaki | ...................... | F16D 65/18 74/89.4 |
| 2006/0169548 A1 * | 8/2006 | Corbett | ................... | F16D 28/00 188/72.8 |
| 2009/0270220 A1 * | 10/2009 | Fukano | ..................... | F16H 3/54 475/300 |
| 2015/0377261 A1 * | 12/2015 | Weh | ........................ | B60T 17/02 92/33 |

FOREIGN PATENT DOCUMENTS

JP H04-22767 A 1/1992

* cited by examiner

*Primary Examiner* — Justin Holmes
(74) *Attorney, Agent, or Firm* — Maginot, Moore & Beck LLP

(57) ABSTRACT

A pressure generator for a hydraulic vehicle brake system includes a piston cylinder unit with a cylinder and a piston, a ball screw drive, an electric hollow-shaft motor which surrounds and is configured to drive the ball screw drive, and a planetary gear set configured to transmit a rotational movement of the hollow-shaft motor to the ball screw drive. The planetary gear set includes a planetary carrier and an internal gear which are respectfully connected via pint-type positive locking connections to a spindle nut of the ball screw drive and a static tubular force transmitter. The locking connections are configured to enable connections between parts via the respective parts being brought together axially in a hollow shaft of the hollow-shaft motor.

8 Claims, 2 Drawing Sheets

PRESSURE GENERATOR FOR A HYDRAULIC VEHICLE BRAKE SYSTEM

This application claims priority under 35 U.S.C. §119 to patent application no. DE 10 2014 212 413.1, filed on Jun. 27, 2014 in Germany, the disclosure of which is incorporated herein by reference in its entirety.

The disclosure relates to a pressure generator for a hydraulic vehicle brake system. The pressure generator is provided in particular for a hydraulic power brake system, and can also be used for slip regulation in hydraulic power brake systems, servo brake systems and manual brake systems. The disclosure also relates to an installation tool for the pressure generator, and to a method for assembling the pressure generator.

BACKGROUND

The Japanese patent application JP H04 22767 A has disclosed a pressure generator, referred to as a hydraulic plunger pump, with a ball screw drive and a piston-cylinder unit. The ball screw drive has a spindle nut which can be driven in rotation by means of an electric motor and which thus axially moves a spindle, which in turn moves a piston in a cylinder of the piston-cylinder unit. In one embodiment, the spindle nut is driven in rotation directly by way of a coaxially arranged electric hollow-shaft motor which surrounds the ball screw drive, and in another embodiment, by way of an electric motor, which is arranged axially parallel and adjacent to the helical gearing, via a spur gear mechanism.

SUMMARY

The pressure generator according to the disclosure has a piston-cylinder unit with a cylinder and with a piston which is movable in the cylinder, and has a helical gearing for moving the piston. The helical gearing has a rotatable, axially fixed component which has a thread, and an axially movable, rotationally fixed component which has a counterpart thread, the counterpart thread of which engages directly or indirectly, for example via rolling bodies, with the thread of the rotatable component of the helical gearing. The act of the rotatable component of the helical gearing being driven in rotation causes the axially movable component of the helical gearing to be moved axially. The axially movable component of the helical gearing is axially fixed to the piston of the piston-cylinder unit, such that a movement of the axially movable component of the helical gearing moves the piston in the cylinder of the piston-cylinder unit.

According to the disclosure, the pressure generator has a hollow, for example tubular, force transmitter by means of which an axial force imparted by exertion of pressure by way of the piston-cylinder unit is transmitted between the piston-cylinder unit and the rotatable component of the helical gearing. The force transmitter can transmit the axial force directly or indirectly via one or more further components. In particular, the rotatable component of the helical gearing is rotatably supported axially on the force transmitter, and the force transmitter is connected directly or indirectly to the cylinder of the piston-cylinder unit. At least a part of a length of the helical gearing is accommodated in the hollow force transmitter, permitting a compact construction of the pressure generator.

The pressure generator according to the disclosure has a planetary gear set for driving the rotatable component of the helical gearing in rotation, which planetary gear set is arranged coaxially with respect to the helical gearing at an end of the helical gearing remote from the piston-cylinder unit. A planet carrier of the planetary gear set is connected rotationally conjointly to the rotatable component of the helical gearing by way of a positively locking connection, such that the act of the planet carrier of the planetary gear set being driven in rotation causes the rotatable component of the helical gearing to be driven in rotation. For assembly, the planet carrier can be mounted axially onto the rotatable component of the helical gearing, that is to say the positively locking connection is designed so as to engage, that is to say to connect the planet carrier rotationally conjointly to the rotatable component of the helical gearing by positive locking, by way of an axial movement of the planet carrier relative to the rotatable component of the helical gearing.

Furthermore, an internal gear of the planetary gear set of the pressure generator according to the disclosure is likewise connected rotationally conjointly to the force transmitter by way of a positively locking connection. Said positively locking connection, too, is engaged by way of an axial movement of the force transmitter relative to the internal gear.

The claims relate to advantageous embodiments and refinements of the disclosure.

Rotationally conjoint positively locking connections that can be made by way of an axial movement are for example a tongue-and-groove connection, a polygonal connection or a spline connection. An embodiment of the disclosure provides a pin-type connection with an eccentrically arranged, axially parallel pin which engages into a hole. A pin is basically sufficient which is suitable for example for the rotationally conjoint positively locking connection of the internal gear of the planetary gear set to the hollow force transmitter. A refinement provides a pin-type connection with multiple pins as a positively locking connection, the pins of which are arranged so as to be distributed uniformly or non-uniformly over a circumference.

A preferred refinement of the disclosure which permits a compact construction of the pressure generator provides an electric hollow-shaft motor for the rotational drive of the planetary gear set. The hollow-shaft motor has a cup-shaped rotor which surrounds the planetary gear set and at least a part of a length of the helical gearing. A face wall of the rotor situated at the planetary gear set side has installation openings through which the planet gears together with the planet carrier and the internal gear of the planetary gear set can be held in the rotor while being assembled together with the rotatable component of the helical gearing and the hollow force transmitter.

Another embodiment relates to an installation tool with holders for the planet gears and the internal gear of the planetary gear set, wherein the planet gears can also be held by way of the planet carrier. The installation tool holds the planet gears and the internal gear in the correct position through the installation openings in the face wall of the rotor of the hollow-shaft motor. "In the correct position" means that the positively locking connections of the internal gear to the force transmitter and of the planet carrier to the rotatable component of the helical gearing are made by way of an axial movement, and in particular do not strike one another as a result of their being rotationally misaligned. After assembly, the installation tool or the holder thereof is pulled out axially through the installation openings in the face wall of the rotor of the hollow-shaft motor.

BRIEF DESCRIPTION OF THE DRAWINGS

The disclosure will be discussed in more detail below on the basis of an embodiment of the disclosure which is illustrated in the drawing, in which.

DETAILED DESCRIPTION

Figure 1:
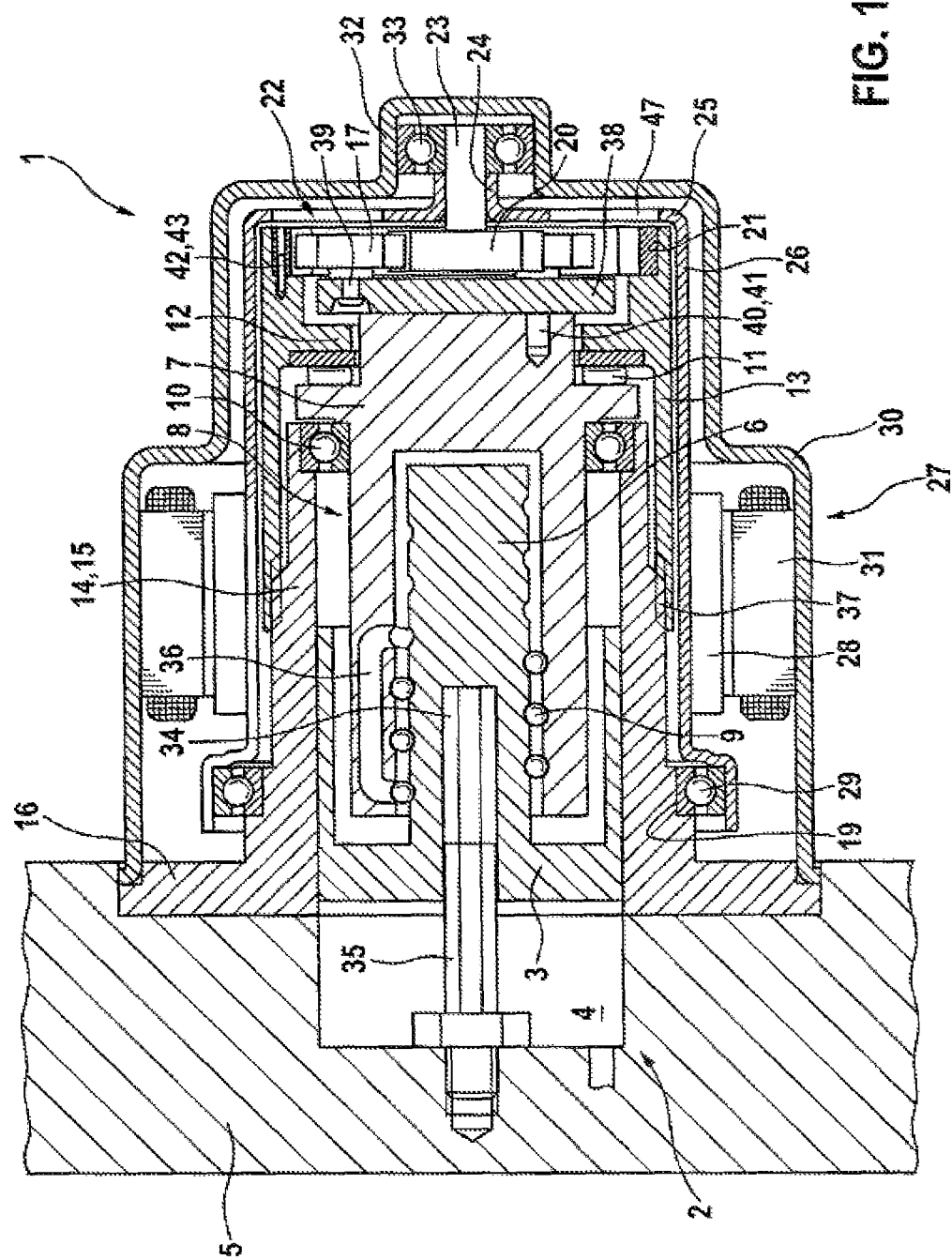
FIG. 1 shows an axial section through a pressure generator according to the disclosure.

The pressure generator 1 according to the disclosure as illustrated in the drawing serves for generating pressure in a hydraulic power brake system. Said pressure generator may also be used for slip regulation. The pressure generator 1 has a piston-cylinder unit 2 with a piston 3 and with a cylinder 4 which is in the form of a cylindrical recess in a hydraulic block 5 of the vehicle brake system, which is not otherwise illustrated. The hydraulic block 5 serves for the mechanical mounting and hydraulic interconnection of hydraulic components of a slip regulation system of the vehicle brake system, such as solenoid valves, check valves, hydraulic accumulators and the piston-cylinder unit 2. Hydraulic blocks 5 of said type for vehicle brake systems with slip regulation are known and will not be discussed in any more detail here. In a power brake system, the piston-cylinder unit 2 serves for building up a pressure instead of a foot-operated or hand-operated master brake cylinder, the latter serving as a brake force setpoint value encoder for a power braking operation and being capable of generating a brake pressure for a servo braking operation in the event of failure of the power brake.

The piston 3 of the piston-cylinder unit 2 is in the form of a hollow piston and has a spindle 6 arranged coaxially, and rigidly connected, therein. The spindle 6 is thus axially fixed and radially fixed to the piston 3. The spindle 6 is arranged coaxially in a spindle nut 7 which projects into the piston 3 of hollow form. The act of the rotatable and axially fixed spindle nut 7 being driven in rotation causes the spindle 6, and with it the piston 3, to be moved axially, such that the piston 3 generates a hydraulic pressure in the cylinder 4. Together, the spindle 6 and the spindle nut 7 form a helical gearing 8. In the illustrated embodiment of the disclosure, the helical gearing 8 is in the form of a ball screw drive with a ball return channel 36 and with balls 9 as rolling bodies which roll in helical grooves formed as a thread and counterpart thread on the spindle 6 and in the spindle nut 7 respectively. In general, the spindle 6 and the spindle nut 7 may be regarded as being components of the helical gearing 8, wherein the spindle nut 7 forms a rotatable, axially fixed component, which has a thread, of the helical gearing 8, and the spindle 6 forms an axially displaceable, rotationally conjoint component, which has a counterpart thread, of the helical gearing 8. In the embodiment as a ball screw drive, the thread of the spindle nut 7 and the counterpart thread of the spindle 6 are in indirect engagement by way of the balls 9, such that as already described, the act of the spindle nut 7 being driven in rotation causes the spindle 6 together with the piston 3 to be moved axially. In embodiments of the disclosure, a reversed situation is also conceivable, that is to say a rotatable and axially fixed spindle and a rotationally fixed and axially movable spindle nut (not illustrated), wherein in this case, the spindle nut is connected to, and is for example also integral with, the piston 3 and moves the latter when the spindle is driven in rotation. For rotational fixing, the piston 3 and the spindle 6 have an axial blind bore 34 with a hexagonal cross section, into which there projects a hexagonal bar 35 which is screwed rotationally fixedly into the hydraulic block 5 at the base of the cylinder 4.

The spindle nut 7 is rotatably mounted by way of a radial bearing 10 in a tubular collar 14 of a flange part 15, and is supported axially and rotatably by way of an axial bearing 11, which in one embodiment is in the form of a needle-roller bearing, on a flange, which in this case is referred to as counterbearing 12 and which is arranged in a tubular force transmitter 13. In the embodiment, the radial bearing 10 and the axial bearing 11 are arranged at an end of the spindle nut 7 which is remote from the piston 3. The force transmitter 13 has a thread 37 by means of which it is screwed onto a counterpart thread of the tubular collar 14 of the flange part 15, that is to say fixedly connected to the collar 14.

The flange part 15 has a flange 16 which is fastened in a countersunk recess of the hydraulic block 5. The flange part 15 is coaxial with the cylinder 4, the piston 3, the spindle 6 and the spindle nut 7. The collar 14 of the flange part 15 guides the piston 3 coaxially with respect to the cylinder 4 and in axially displaceable fashion. Via the piston 3, the collar 14 of the flange part 15 guides the spindle 6, which is rigidly and thus radially fixedly connected to the piston 3, of the helical gearing 8 coaxially with respect to the cylinder 4 and with respect to the spindle nut 7 and in axially displaceable fashion. If the piston 3 is moved into the cylinder 4 for the purposes of generating pressure, a compressive force acts on the spindle 6 and on the spindle nut 7, which compressive force is supported axially, via the axial bearing 11, on the counterbearing 12 in the force transmitter 13. The force transmitter 13, which is screwed to the collar 14 of the flange part 15, conducts a tensile force, which arises as a reaction force to the compressive force in the spindle 6 and the spindle nut 7, into the hydraulic block 5, which has the cylinder 4 of the piston-cylinder unit 2, via the flange part 15 which is fastened to the hydraulic block 5. The compressive and tensile forces that arise during the generation of pressure are thus conducted on a short path as internal forces in a closed loop, such that there are no outwardly acting forces that must be supported.

At an end of the spindle nut 7 remote from the piston 3, there is arranged a planetary gear set 22 with a sun gear 20, planet gears 17, a planet carrier 38 and an internal gear 21. The planet gears 17 are arranged rotatably on pins which are inserted as planet gear shafts 39 into the planet carrier 38. In the embodiment illustrated, the planetary gear set 22 has three planet gears 17, though this is not imperatively necessary for the disclosure.

The planet carrier 38 is a circular disk which, by way of a positively locking connection 40, is attached rotationally conjointly to a face end, which is remote from the piston 3, of the spindle nut 7. In the illustrated embodiment of the disclosure, the positively locking connection 40 of the planet carrier 39 to the spindle nut 7 is in the form of a pin-type connection with a number of axially parallel pins 41 arranged eccentrically and uniformly or non-uniformly over a circumference. The positively locking connection 40 can be assembled by way of axial movement of the planet carrier 38 relative to the spindle nut 7, which may also be referred to as the positively locking connection 40 being made. Other positively locking connections 40 that can be made axially are possible for the purposes of the rotationally conjoint connection of the planet carrier 38 to the spindle nut 7, such as for example a tongue-and-groove connection, a spline profile or a polygon. This list is not exhaustive but merely exemplary.

The internal gear 21 of the planetary gear set 22 is inserted into an end of the tubular force transmitter 13 remote from the piston 3; said internal gear bears axially against an annular step in the force transmitter 13. The internal gear 21 is connected rotationally conjointly, by way of a positively locking connection 42, to the force transmitter 13. In the illustrated embodiment of the disclosure, said positively locking connection 42 is also a pin-type connection with pins 43 projecting axially in parallel from the internal gear 21, which pins engage into holes in the force transmitter 13. The positively locking connection 42 of the internal gear 21 to the force transmitter 13 is also made by way of an axial movement of the internal gear 21 relative to the force transmitter 13, and in this case, too, other positively locking connections 42 that can be made axially are possible for the purposes of the rotationally conjoint connection of the internal gear 21 to the force transmitter 13, such as for example a tongue-and-groove connection, a spline profile or a polygon. This list is not exhaustive but merely exemplary.

The sun gear 20 is rotationally conjoint with a shaft 23 which is pressed rotationally conjointly into a collar 24 in a face wall 25 of a cup-shaped hollow shaft 26 of an electric hollow-shaft motor 27. The hollow shaft 26 has poles or permanent magnets 28 at the outside, and may also be regarded as the rotor of the electric hollow-shaft motor 27. The hollow shaft 26 concentrically surrounds the planetary gear set 22, the helical gearing 8, the force transmitter 13 and the collar 14 of the flange part 15. Said hollow shaft is rotatably mounted, close to the flange 16, by way of a ball bearing as rotary bearing 29. The rotary bearing 29, which is close to the flange, of the hollow shaft 26 is pressed onto a bearing seat 19 on the outside of the flange part 15 close to the flange 16.

The electric hollow-shaft motor 27 has a motor housing 30, which is likewise cup-shaped and of stepped diameter and the open end of which is fastened to the flange 16 of the flange part 15. At an inner side, the housing 30 has electromagnets as stator magnets 31. The motor housing 30 with the stator magnets 31 can also be regarded as the stator of the electric hollow-shaft motor 27. At a closed end remote from the flange 16, there is formed on the motor housing 30 a hollow cylindrical bearing seat 32 in which there is arranged a ball bearing as rotary bearing 33. The rotary bearing 33 serves for rotatably mounting the shaft 23, with which the sun gear 20 of the planetary gear set 22 is rotationally conjoint and which is rotationally conjoint with the hollow shaft 26 by being pressed into the collar 24 of the hollow shaft 26. The rotary bearing 23 thus serves for rotatably mounting both the hollow shaft 26 of the electric hollow-shaft motor 27 at the end remote from the flange 16, and at the same time also for rotatably mounting the sun gear 20 of the planetary gear set 22. When the hollow shaft 26 of the electric hollow-shaft motor 27 is driven in rotation, the sun gear 20, which is rotationally conjoint with the hollow shaft 26, of the planetary gear set 22 is driven in rotation and drives the planet gears 17 such that they perform a revolving movement, which causes the planet carrier 38 and the spindle nut 7 to be driven in rotation.

Figure 2:
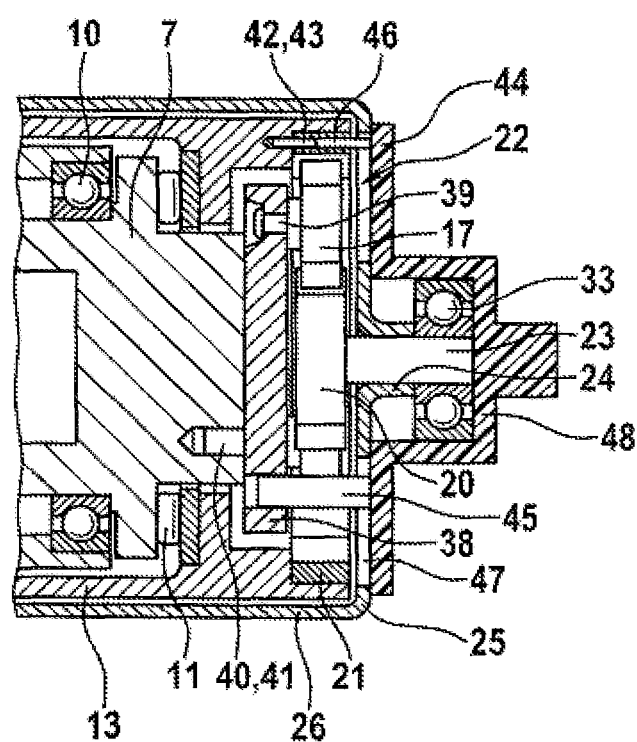
FIG. 2 shows parts of the pressure generator and an installation tool according to the disclosure during the assembly process.

For the assembly of the pressure generator 1 or for the installation of the planetary gear set 22 and the spindle nut 7 of the helical gearing 8 into the hollow shaft 26 of the hollow-shaft motor 27, the shaft 23, which is rotationally conjoint with the sun gear 20, is pressed from the inside into the collar 24 of the face wall 25 of the hollow shaft 26, such that the sun gear 20 is arranged rotationally conjointly and coaxially with the hollow shaft 26 on an inner side of the face wall 25 of said hollow shaft. The rotary bearing 33 may be pressed from the outside onto a protruding end of the shaft 23 at the same time or later. From the outside, an installation tool 44 is mounted onto the face wall 25 of the rotor 26, which installation tool has axially parallel pins as holders 45, 46 for the planet carrier 38 and the internal gear 21 (FIG. 2). Pins as holders 45, 46 are not imperative for the disclosure. The holders 45, 46 extend through installation openings 47 in the face wall 25 of the hollow shaft 26. The planet carrier 38 and the internal gear 21 have holes corresponding to the holders 45, 46 associated therewith. The planet carrier 38, with the planet gears 17 arranged rotatably thereon, is mounted from the inside, in the hollow shaft 26, onto the holder 45 of the installation tool 44, and the internal gear 21 is likewise mounted from the inside, in the hollow shaft 26, onto that holder 46 of the installation tool 44 which is associated therewith. The installation tool 44 has a hollow cylindrical hub 48, by way of which it is mounted onto the rotary bearing 33 which is pressed onto the shaft 23. In this way, the installation tool 44 is centered on the hollow shaft 26. If the rotary bearing 23 is pressed on at a later point in time, the installation tool 44 may be centered on the shaft 23 or in some other way on the hollow shaft 26 (not illustrated). The installation tool 44 holds the planet carrier 38 and the internal gear 21 in a specified angular position, such that the force transmitter 13 and the spindle nut 7 can be inserted into the hollow shaft 26 from an inner side of the rotor 26, wherein the positively locking connections 40, 42 between the spindle nut 7 and the planet carrier 38 and between the force transmitter 13 and the internal gear 21 are made, and the planet carrier 38 is connected rotationally conjointly to the spindle 7 and the internal gear 21 is connected rotationally conjointly to the force transmitter 13. The force transmitter 13 may be screwed to the flange part 15 before insertion into the hollow shaft 26, or the flange part 15 may be screwed to the force transmitter 13 after the insertion of the latter. By means of the installation tool 44, the force transmitter 13 can be held rotationally fixed for the process of being screwed to the flange part 15. After the installation of the planetary gear set 22, the spindle nut 7 and the force transmitter 13 into the hollow shaft 26, the installation tool 44 is pulled out axially.

What is claimed is:

1. A pressure generator for a hydraulic vehicle brake system, comprising:
    a piston cylinder unit that includes:
        a cylinder; and
        a piston that is movable within the cylinder;
    a hollow force transmitter;
    a helical gearing that is at least partially positioned within the hollow force transmitter, and that includes:
        a rotatable, axially fixed first component that has a thread; and
        an axially movable, rotationally fixed second component that is axially and rotationally fixed to the piston and that has a counterpart thread that engages the thread of the first component such that driving the first component in rotation causes the second component and the piston to move;
        wherein the hollow force transmitter is configured to transmit an axial force imparted by exertion of pressure via the piston-cylinder unit on the piston to the first component;
    a planetary gear set that is configured to drive the first component in rotation, that is positioned coaxially with respect to the helical gearing at an end of the helical gearing remote from the piston-cylinder unit, and that includes:
        a planet carrier that is connected rotationally conjointly to the first component via an axial positively locking connection; and an internal gear that is connected rotationally conjointly to the hollow force transmitter via a further axial positively locking connection.

2. The pressure generator according to claim 1, wherein at least one of the positively locking connection and the further positively locking connection has an eccentric, axially parallel pin which is configured to engage a hole of at least one of the planet carrier, the first component, the internal gear, and the hollow force transmitter.

3. The pressure generator according to claim 2, wherein at least one of the positively locking connection and the further positively locking connection has a plurality of eccentric and axially parallel pins which are positioned so as to be distributed over a circumference of at least one of the planet carrier, the first component, the internal gear, and the hollow force transmitter, and which are configured to engage into holes of at least one of the planet carrier, the first component, the internal gear, and the hollow force transmitter.

4. The pressure generator according to claim 1, wherein:
the first component includes a spindle nut; and
the second component includes a spindle.

5. The pressure generator according to claim 1, wherein the helical gearing includes a roller-type screw drive with rolling bodies, wherein the thread of the first component engages with the counterpart thread of the second component via the roller bodies.

6. The pressure generator according to claim 1, further comprising an electric hollow-shaft motor that is configured to drive the planetary gear set in rotation, and that includes a cup-shaped hollow shaft which surrounds the planetary gear set and at least a portion of a length of the helical gearing, wherein:
the hollow shaft has a face wall on a side of the planetary gear set that is remote from the piston-cylinder unit that defines installation openings; and
the planetary gear set further includes a sun gear that is rotationally conjoint with the hollow shaft.

7. An installation tool for a planetary gear set of a pressure generator that includes a piston cylinder unit having a cylinder and a piston that is movable within the cylinder, a hollow force transmitter, a helical gearing that is at least partially positioned within the hollow force transmitter, and that includes a rotatable, axially fixed first component that has a thread and an axially movable, rotationally fixed second component that is axially and rotationally fixed to the piston and that has a counterpart thread that engages the thread of the first component such that driving the first component in rotation causes the second component and the piston to move, the hollow force transmitter being configured to transmit an axial force imparted by exertion of pressure via the piston-cylinder unit on the piston to the first component, a planetary gear set that is configured to drive the first component in rotation, that is positioned coaxially with respect to the helical gearing at an end of the helical gearing remote from the piston-cylinder unit, and that includes, a planet carrier that is connected rotationally conjointly to the first component via an axial positively locking connection and an internal gear that is connected rotationally conjointly to the hollow force transmitter via a further axial positively locking connection, and an electric hollow-shaft motor that is configured to drive the planetary gear set in rotation, and that includes a cup-shaped hollow shaft which surrounds the planetary gear set and at least a portion of a length of the helical gearing, the hollow shaft having a face wall on a side of the planetary gear set that is remote from the piston-cylinder unit that defines installation openings, and the planetary gear set further including a sun gear that is rotationally conjoint with the hollow shaft, the installation tool comprising:
holders configured to hold planet gears and the internal gear of the planetary gear set in a correct position through installation openings defined in the face wall of the hollow shaft of the electric hollow-shaft motor, wherein the installation tool is configured to be removed from the planetary gear set through the installation openings.

8. A method of assembling a pressure generator, comprising:
engaging holders of an installation tool through installation openings defined in a face wall of a cup-shaped hollow shaft of an electric hollow-shaft motor for a pressure generator, the pressure generator including a piston-cylinder unit that is positioned on a side of the hollow shaft remote from the face wall, and that has a cylinder and a piston movable in the cylinder;
arranging planet gears, a sun gear, and an internal gear, with a planet carrier of a planetary gear set, in the hollow shaft and on the holders of the installation tool such that the hollow shaft surrounds the planetary gear set, and such that the sun gear is rotationally conjoint with the hollow shaft so that the hollow shaft is configured to drive the planetary gear set in rotation;
inserting a hollow force transmitter and a helical gearing into the hollow shaft, wherein:
the helical gearing includes a rotatable, axially fixed first component that has a thread, and an axially movable, rotationally fixed second component that is axially and rotationally fixed to the piston and that has a counterpart thread that engages the thread of the first component such that driving the first component in rotation causes the second component and the piston to move;
the hollow force transmitter is configured to transmit an axial force imparted by exertion of pressure via the piston-cylinder unit on the piston to the first component;
the planetary gear set is configured to drive the first component in rotation;
the force transmitter and helical gearing are inserted into the hollow shaft at an angular orientation such that (i) the hollow shaft surrounds at least a portion of a length of the helical gearing set, (ii) the helical gearing is positioned coaxially with respect to the planetary gear set, and (iii) a rotationally conjoint positively locking connection between the planet carrier and the first component, and a rotationally conjoint positively locking connection between the internal gear and the force transmitter are engaged; and
subsequent to the inserting, removing the installation tool through the installation openings in the face wall of the hollow shaft of the electric hollow-shaft motor.

* * * * *